United States Patent
Cai et al.

(10) Patent No.: US 9,820,127 B2
(45) Date of Patent: Nov. 14, 2017

(54) ONLINE CHARGING ARCHITECTURE IN LTE/EPC COMMUNICATION NETWORKS

(75) Inventors: Yigang Cai, Naperville, IL (US); Xiangyang Li, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 866 days.

(21) Appl. No.: 12/989,621

(22) PCT Filed: May 30, 2008

(86) PCT No.: PCT/US2008/065347
§ 371 (c)(1),
(2), (4) Date: Oct. 25, 2010

(87) PCT Pub. No.: WO2009/145785
PCT Pub. Date: Dec. 3, 2009

(65) Prior Publication Data
US 2011/0066530 A1    Mar. 17, 2011

(51) Int. Cl.
*G07B 17/00* (2006.01)
*H04W 4/24* (2009.01)
(Continued)

(52) U.S. Cl.
CPC .............. *H04W 4/24* (2013.01); *G06Q 40/12* (2013.12); *H04L 12/1403* (2013.01);
(Continued)

(58) Field of Classification Search
CPC ........ G06Q 40/10; G06Q 40/02; G06Q 40/00; G06Q 30/04; G06Q 20/10
(Continued)

(56) References Cited

U.S. PATENT DOCUMENTS

| | | | | |
|---|---|---|---|---|
| 7,734,025 B2 * | 6/2010 | Baker | ................ | H04M 3/2218 379/114.01 |
| 7,899,039 B2 * | 3/2011 | Andreasen | .......... | H04L 12/1403 370/354 |

(Continued)

FOREIGN PATENT DOCUMENTS

| | | |
|---|---|---|
| CN | 101127629 A | 2/2008 |
| CN | 101183956 A | 5/2008 |

(Continued)

OTHER PUBLICATIONS

3GPP: "3rd Generation Partnership Project; Technical Specification Group Services and System Aspects; Telecommunication management; Study on Charging Management; 3GPP Evolved Packet Core (EPC): Charging aspects (Release 8)" 3GPP Draft; 32820-200, 3rd Generation Partnership Project (3GPP), Mobile Competence Centre; 650, Route Des Lucioles; F-06921 Sophia-Antipolis Cedex; France, vol. tsg_sa\TSG_SA\TSGS_38\Docs, no. Mexico; Dec. 3, 2007, (Nov. 14, 2007), XP050210078, all pages.

(Continued)

*Primary Examiner* — Garcia Ade
(74) *Attorney, Agent, or Firm* — Duft Bornsen & Fettig, LLP

(57) ABSTRACT

Communication networks and methods are disclosed for performing online charging in LTE/EPC communication networks. In an LTE/EPC communication network, one or more LTE network elements connect to an Online Charging System (OCS) over an enhanced interface. The LTE network element that is serving a session for a mobile device triggers on a charging event, and generates a credit request message (e.g., Diameter CCR). The LTE network element identifies access information for the session indicating the type of access for the mobile device to the LTE/EPC communication network, and inserts the access information in the credit request message. Through the enhanced interface, the LTE (Continued)

network element is able to transmit the credit request message to the OCS with the access information. The access information may then be used in the OCS to determine a more accurate charging rate for the session.

20 Claims, 8 Drawing Sheets

(51) Int. Cl.
*H04L 12/14* (2006.01)
*H04M 15/00* (2006.01)
*G06Q 40/00* (2012.01)
*H04B 7/212* (2006.01)

(52) U.S. Cl.
CPC ...... *H04L 12/1425* (2013.01); *H04L 12/1453* (2013.01); *H04L 12/1485* (2013.01); *H04M 15/64* (2013.01); *H04M 15/66* (2013.01)

(58) Field of Classification Search
USPC .................................. 705/30; 21/30
See application file for complete search history.

(56) References Cited

U.S. PATENT DOCUMENTS

| 8,175,575 | B2* | 5/2012 | Cai et al. ........................ 455/406 |
| 2008/0046963 | A1* | 2/2008 | Grayson ................. H04L 12/66 726/1 |
| 2008/0126230 | A1 | 5/2008 | Bellora et al. |
| 2008/0137592 | A1* | 6/2008 | Ahmavaara ........... H04W 16/18 370/328 |
| 2008/0229385 | A1* | 9/2008 | Feder ..................... H04L 12/14 726/1 |
| 2009/0264096 | A1* | 10/2009 | Cai et al. ...................... 455/406 |
| 2011/0066530 | A1* | 3/2011 | Cai et al. ......................... 705/30 |

FOREIGN PATENT DOCUMENTS

| CN | 1961567 A | 4/2014 |
| CN | 101136758 | 4/2014 |
| JP | 2006157932 A | 6/2006 |
| JP | 2007251977 | 9/2007 |
| JP | 2007282223 | 10/2007 |
| JP | 2007534210 | 11/2007 |
| WO | 2009131614 A1 | 10/2009 |

OTHER PUBLICATIONS

"3GPP TS 23.203 V7.1.0. 3rd Generation Partnership Project; Technical Specification Group Services and System Aspects; Policy and charging control architecture (Release 7)" 3GPP TS 23.203 V7.1.0 Dec. 1, 2006 (Dec. 10, 2006), pp. 1-70, XP002492478 Retrieved from the Internet: URL: http://www.3gpp.org/ftp/Specs/archive23%5Fseries/23.203/, all pages.

"3rd Generation Partnership Project; Technical Specification Group Service and System Aspects; elecommunication management; Charging management; Diameter charging applications (Release 8)" 3GPP TS 32.299 V8.0.0 (Sep. 2007) 650 Route des Lucioles—Sophia Antipolis Valbonne—France; © 2007, 3GPP Organizational Partners.

3GPP TS 23.203 V7.6.0, 3rd Generation Partnership Project; Technical Specification Group Services and System Aspects; Policy and charging control architecture (Release 7), Mar. 2008, pp. 55, 58 and 59, URL, http://www.3gpp.org/ftp Specs/archive/23_series/23.203/23203_760.zip.

* cited by examiner

ONLINE CHARGING ARCHITECTURE IN LTE/EPC COMMUNICATION NETWORKS

RELATED APPLICATIONS

This application is the National Stage under 35 U.S.C. 371 of International Application No. PCT/US08/65347, filed May 30, 2008, which is incorporated by reference herein.

BACKGROUND OF THE INVENTION

1. Field of the Invention

The invention is related to the field of communication networks and, in particular, to an online charging architecture in LTE/EPC communication networks.

2. Statement of the Problem

Service providers typically provide numerous voice and/or data services to subscribers using one or more wireline and/or wireless communication networks. Exemplary services include cellular telephony, access to the Internet, gaming, broadcasting or multicasting of audio, video, and multimedia programming, etc. Mobile devices, such as cell phones, personal data assistants, smart phones, pagers, text messaging devices, global positioning system (GPS) devices, network interface cards, notebook computers, and desktop computers, may access the services provided by the communication networks over an air interface with one or more base stations. Communication between the mobile devices and base stations is governed by various standards and/or protocols, such as the standards and protocols defined by the 3rd Generation Partnership Project (3GPP, 3GPP2).

The service providers use offline and online charging functions to keep track of the charges incurred by each device for using the various services. The 3GPP/3GPP2 standards groups have defined a set of specifications that may be used to implement online charging systems and offline charging systems to cover charging in the various network domains (e.g., a circuit switching network domain, a packet switching network domain, and/or a wireless domain), IP multimedia subsystems (IMS), and emerging 3G/OMA application services.

Online charging is generally defined as a charging mechanism where charging information can affect, in real-time, the service rendered, and therefore a direct interaction of the charging mechanism with session/service control is needed. In online charging, charging information for network resource usage is collected concurrently with the resource usage. However, authorization for the network resource usage must be obtained by the network prior to the actual resource usage. The network elements in a communication network include Charging Trigger Functions (CTF). For online charging, the CTF triggers on charging events, collects charging information pertaining to the charging events, and assembles the charging information into matching charging events. The CTF then transmits credit request messages to the Online Charging System (OCS) to obtain authorization for the charging event/network resource usage requested by the user. The CTF delays the actual resource usage until permission has been granted by the OCS. When a granted quota of service units is obtained from the OCS, the CTF in the network element performs budget control during the resource usage. The CTF enforces termination of the end user's resource usage when permission by the OCS is not granted or expires.

There are a variety of types of networks operable to provide voice and data communications for mobile users. One present project within the 3GPP is the Long Term Evolution (LTE) which is a project to improve the UMTS mobile phone standard to cope with future requirements. The architecture defined by this project is referred to as the Evolved Packet System (EPS). The EPS architecture comprehends E-UTRAN (Evolved UTRAN) on the access side and EPC (Evolved Packet Core) on the core side.

One problem with LTE/EPC networks is that charging (i.e., a charging architecture and function) has not been effectively defined in detail. 3GPP TS 32.820 describes high level charging requirements for LTE/EPC networks in roaming and non-roaming scenarios. 3GPP TS 32.820 has copied the Packet Domain (PD) charging architecture and the WLAN charging architecture from 3GPP TS 32.251 and 32.252, respectively, but does not adequately describe charging in an LTE/EPC communication network or adequately describe an LTE/EPC charging architecture. Thus, network operators and designers are unsure how to implement online charging in LTE/EPC communication networks.

SUMMARY OF THE SOLUTION

Embodiments of the invention solve the above and other related problems with a new LTE/EPC charging architecture that may be used for online charging in LTE/EPC communication networks. In accordance with the charging architecture, one or more network elements in the LTE/EPC communication network connect with an Online Charging System (OCS) over an enhanced interface. The enhanced interface allows for access information to be provided by the network elements to the OCS, and may also allow for an LTE charging ID to be provided to the OCS. The access information indicates the type of access used by a mobile device to access IP services in the LTE/EPC communication network. By having the access information, the OCS is able to determine a more accurate charging rate for the session. By having the LTE charging ID, the OCS is able to accurately correlate charging messages for the session that are received from different network elements and different networks.

In one embodiment, an LTE/EPC communication network includes an OCS and one or more LTE network elements, such as a Packet Data Network Gateway (PDN-GW), a 3GPP AAA server or 3GPP AAA proxy, etc. The LTE network elements connect to the OCS over an enhanced interface, such as an enhanced Gy, Wo, or Ro interface. The LTE network elements are operable to generate a credit request message responsive to a charging event for a session involving a mobile device. One example of a credit request message comprises a Diameter Credit Control Request (CCR) message. The LTE network elements are further operable to identify access information for the session indicating the type of access for a mobile device to the LTE/EPC communication network. The LTE network elements are further operable to insert the access information in the credit request message, and to transmit the credit request message over the enhanced interface to the OCS.

The OCS is operable to receive the credit request message, and to process the credit request message to identify the access information included in the credit request message. The OCS is further operable to determine a charging rate for the session based on the access information.

If the OCS comprises a visited OCS in a visited network for a roaming session, then the visited OCS may operate as follows. The visited OCS is operable to receive the credit request message, and to process charging rules defined for the mobile device to determine whether to provide credit control or to allow a home OCS in a home network to perform credit control. If the determination is to provide credit control, then the visited OCS is further operable to generate an online charging request message that requests charging information, and to transmit the online charging request message to the home OCS over an enhanced Diameter Rc interface. The visited OCS is further operable to receive an online charging response message from the home OCS over the enhanced Diameter Rc interface that includes charging information for the session. The charging information at least includes an allotment of service units granted by the home OCS, and a subscriber profile or a subset of the subscriber profile of the user of the mobile device. The visited OCS is further operable to process the charging information to determine a charging rate for the session. The visited OCS is further operable to grant a quota of service units for the network element based on the allotment of service units and the charging rate, and to transmit a credit response message to the network element indicating the granted quota. The visited OCS would grant quotas to multiple network elements serving the session based on the allotment, as the visited OCS provides credit control for the session.

If the determination is to allow the home OCS to perform credit control, then the visited OCS is further operable to forward the credit request message to the home OCS over an enhanced Diameter Ro interface. The visited OCS is further operable to receive a credit response message from the home OCS that includes a quota granted for the network element, and to forward the credit response message to the at least one network element indicating the granted quota. The visited OCS acts as a proxy to the home OCS so that the home OCS may provide credit control for the session.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-10 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
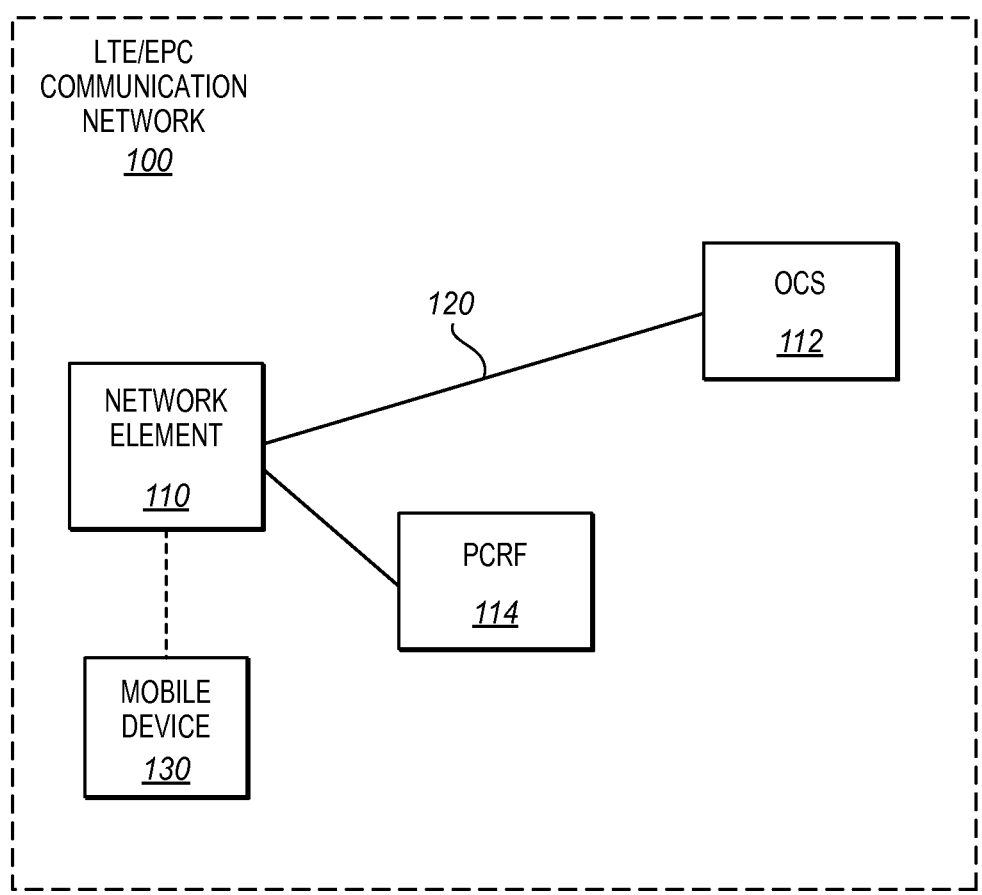
FIG. 1 illustrates an LTE/EPC communication network in an exemplary embodiment of the invention.

FIG. 1 illustrates an LTE/EPC communication network 100 in an exemplary embodiment of the invention. Communication network 100 includes one or more LTE network elements 110, an Online Charging System (OCS) 112, and a Policy and Charging Rules Function (PCRF) 114. Network element 110 comprises any system, server, or function operable to provide session control or provide a service for a session in communication network 100. Examples of network element 110 include a Packet Data Network gateway (PDN-GW), a 3GPP AAA server or AAA proxy, and Operator IP services (i.e., IMS services). OCS 112 comprises any system, server, or function operable to provide online charging for sessions in communication network 100. PCRF 114 comprises any system, server, or function operable to store policy and charging rules for one or more users.

Network element 110 connects with OCS 112 over an enhanced interface 120. As the LTE/EPC standards are presently provided, the interfaces defined between network elements and OCS 112 are inadequate for online charging. According to the embodiments described herein, interface 120 is enhanced over the interfaces presently defined by the EPC standards, to allow for effective implementation of online charging in LTE/EPC communication network 100. Interface 120 is enhanced by allowing messages to include access information. Access information comprises any network address, network identifier, or any other data which indicates the type of access used by mobile device 130 to access IP services in LTE/EPC communication network 100. The access information includes the network element information of each access network providing access to mobile device 130. For example, the access information may include a network address (e.g., IPv4 or IPv6 address) for the signaling gateway used to interface mobile device 130 with LTE/EPC communication network 100, such as a serving gateway (SGW) for 3GPP access, or an HRPD Serving gateway (HSGW) for trusted or un-trusted non-3GPP access. The access information may further include a network address for a PDN-GW that is serving a session. Interface 120 may additionally or alternatively be enhanced by allowing messages to include an LTE charging ID that is assigned to the session.

As an example of an enhanced interface 120, assume that LTE network element 110 comprises a Packet Data Network Gateway (PDN-GW). A PDN-GW connects to OCS 112 over an enhanced Gy interface according to the charging architecture described herein. To enhance the Gy interface, the Gy interface includes one or more Attribute Value Pairs (AVP) that indicates access information for mobile device 130. As another example of an enhanced interface 120, assume that LTE network element 110 comprises a 3GPP AAA server or 3GPP AAA proxy. A 3GPP AAA server or 3GPP AAA proxy connects to OCS 112 over an enhanced Diameter Wo interface according to the charging architecture described herein. To enhance the Wo interface, the Wo interface includes one or more AVP that indicates access information for mobile device 130.

In this embodiment, assume that mobile device 130 (also referred to as user equipment (UE)) of a user registers or subscribes to service with communication network 100. Also assume that mobile device 130 initiates or is invited into a session. For the session, network element 110 (and possibly other network elements in communication network 100 that are not shown for the sake of brevity) is requested to provide a service for the session for mobile device 130 or other parties to the session. Network element 110 includes a Charging Trigger Function (CTF) that is operable to identify the service being requested, and initiate online charging for the service or session. As prepaid (online) charging is being used, network element 110 needs permission from OCS 112 before providing the service.

Figure 2:
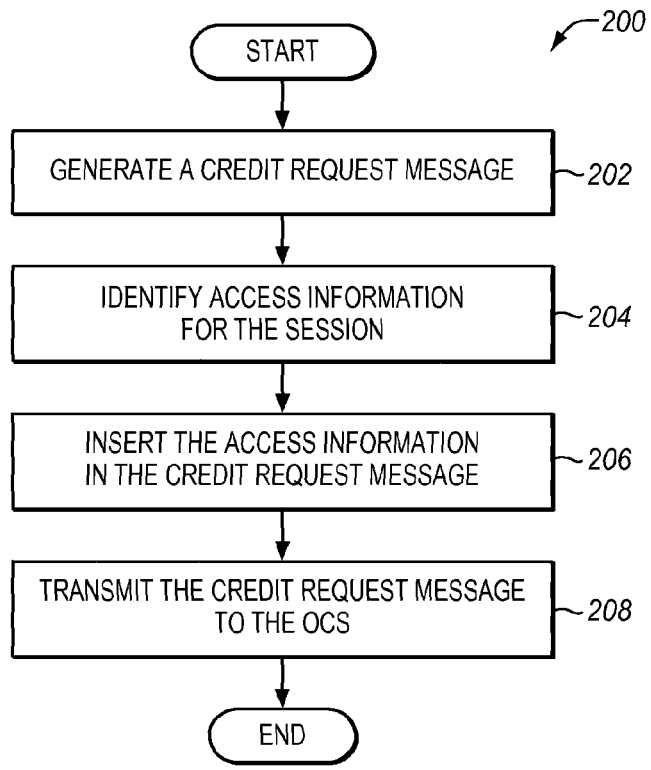
FIG. 2 is a flow chart illustrating a method of providing access information to an OCS in an exemplary embodiment of the invention.

FIG. 2 is a flow chart illustrating a method 200 of providing access information to OCS 112 in an exemplary embodiment of the invention. The steps of method 200 will be described with reference to communication network 100 in FIG. 1, although method 200 may be performed by other communication networks. The steps of the flow chart in FIG. 2 are not all inclusive and may include other steps not shown.

In step 202, network element 110 generates a credit request message for the session when the CTF in network element 110 triggers on a charging event. The credit request message is used to request permission to provide a service. In step 204, network element 110 identifies access information for the session, which indicates the type of access for mobile device 130 for the session. As described above, the access information may include a network address for a signaling gateway used to interface mobile device 130 with communication network 100, a network address for a PDN-GW that is serving mobile device 130, etc. Because an enhanced interface 120 is implemented between network element 110 and OCS 112, network element 110 is able to insert or otherwise include the access information for the session in the credit request message in step 206. For example, the credit request message may include one or more newly-defined AVPs that are designated for the access information. Network element 110 may thus insert the identified access information in the newly-defined AVPs. Network element 110 then transmits the credit request message to OCS 112 over interface 120 in step 208.

Figure 3:
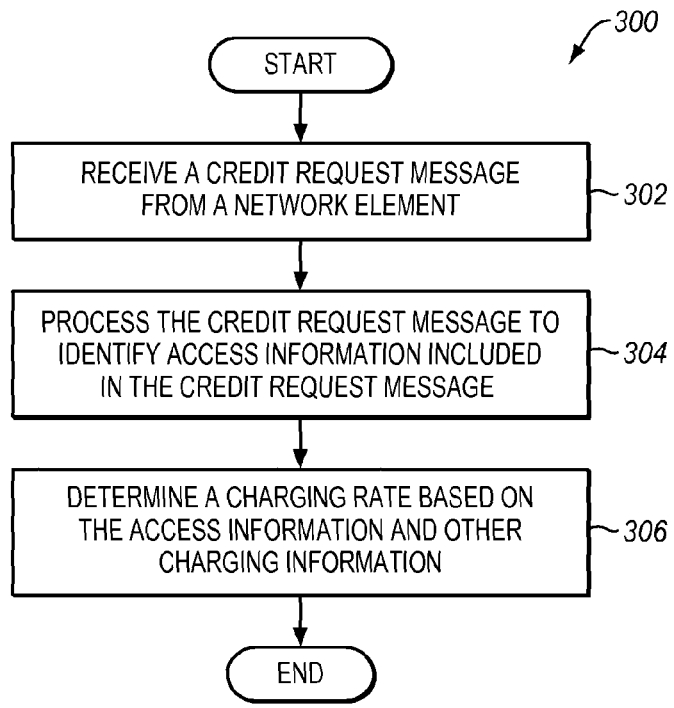
FIG. 3 is a flow chart illustrating a method of processing access information in an OCS in an exemplary embodiment of the invention.

FIG. 3 is a flow chart illustrating a method 300 of processing access information in OCS 112 in an exemplary embodiment of the invention. In step 302, OCS 112 receives the credit request message from network element 110. In step 304, OCS 112 processes the credit request message to identify the access information included in the credit request message. In step 306, OCS 112 processes the access information, and other charging information provided in the credit request message, to determine a charging rate (and also a tariff) for the session. For example, the access information may indicate whether mobile device 130 is located in a home network or is roaming. The access information may also indicate whether mobile device 130 is accessing IP services using 3GPP access, trusted non-3GPP access (i.e., through the same service provider), or un-trusted non-3GPP access (i.e., through a different service provider). OCS 112 uses this information to determine the charging rate for the session.

By using the enhanced interface 120 between network element 110 and OCS 112, network element 110 is advantageously able to provide the access information to OCS 112. OCS 112 may thus process the access information to more accurately determine a charging rate for the session. According to the charging architecture presently defined for LTE/EPC communication networks by the 3GPP, the access information is not available to the OCS as the interfaces (or reference points) are not able to carry such information. Present OCS's are thus not able to determine as accurate of a charging rate as the access information is not available.

In addition to providing the access information in the enhanced interface 120, network element 110 may also provide an LTE charging identifier to OCS 112 to allow OCS 112 to correlate charging messages for the session. The LTE charging identifier comprises any number, string, code, or other identifier that uniquely identifies charging data or charging records for the session. PCRF 114 (see FIG. 1) assigns the LTE charging identifier for the session. PCRF 114 receives requests for policy and charging rules from network element 110 and other network elements that typically include network or access charging identifiers that have already been assigned for the session. In assigning the LTE charging identifier, PCRF 114 may associate the network/access charging identifiers received in the requests. PCRF 114 then transmits the charging rules and the LTE charging identifier to network element 110. Network element 110 then inserts the LTE charging identifier in the credit request message along with the access information.

Figure 4:
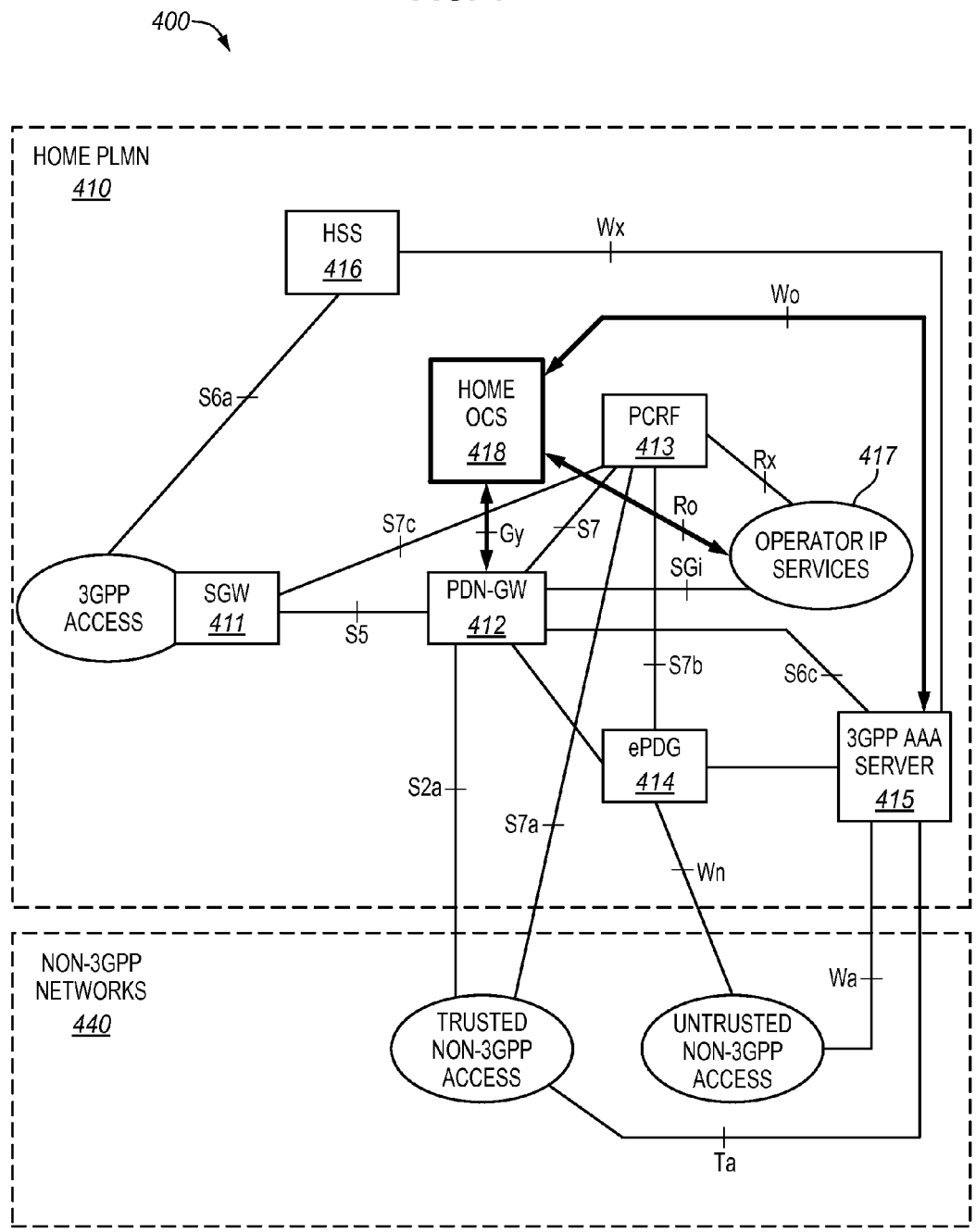
FIG. 4 illustrates an LTE/EPC communication network in a non-roaming scenario in an exemplary embodiment of the invention.

Mobile device 130 may be located in a home network (i.e., non-roaming) or in a visited network (i.e., roaming) when involved in the session. FIG. 4 illustrates an LTE/EPC communication network 400 in a non-roaming scenario in an exemplary embodiment of the invention. Communication network 400 includes a home Public Land Mobile Network (PLMN) 410 comprised of a plurality of network elements, and non-3GPP networks 440. Home PLMN 410 includes a SGW 411, a PDN-GW 412, a PCRF 413, a Packet Data Gateway (PDG) 414, a 3GPP AAA server 415, a Home Subscriber Server (HSS) 416, and Operator IP services 417 (i.e., IMS services). Home PLMN 410 may include other network elements that are not illustrated for the sake of brevity.

The charging architecture for communication network 400 includes an OCS 418 that is implemented in home PLMN 410. In this charging architecture, PDN-GW 412 communicates with OCS 418 through an enhanced Gy interface (or a modified Ro interface) to support online charging based on per data flow/per PDP session. 3GPP AAA server 415 communicates with OCS 418 through an enhanced Wo interface to support online charging. Operator IP services 417 interface with OCS 418 through an enhanced Diameter Ro interface.

The enhanced Gy interface and the enhanced Wo interface include one or more newly-defined AVPs that indicate access information for a mobile device. The access information may include the network address (e.g., IPv4 or IPv6 address) for the signaling gateway used to interface the mobile device with communication network 400. For example, if the mobile device is using 3GPP access, then the access information may include a network address for SGW 411 and a network address for PDN-GW 412. These network addresses indicate to OCS 418 that the mobile device is not roaming, that services are provided by the home PLMN 410, and that access for the mobile device is 3GPP access. In another example, if the mobile device is using trusted non-3GPP access, then the access information may include a network address for a signaling gateway for the non-3GPP access (e.g., an HRPD Serving gateway (HSGW)), and a network address for PDN-GW 412. These network addresses indicate to OCS 418 that the mobile device is not roaming, that services are provided by the home PLMN 410, and that access for the mobile device is trusted non-3GPP access (e.g., a CDMA network). PDN-GW 412 is operable to identify access information for the mobile device, and to insert the access information in the AVPs of the Gy interface. Similarly, AAA server 415 is operable to identify access information for the mobile device, and to insert the access information in the AVPs of the Wo interface.

The enhanced Ro interface includes one or more AVPs that indicate an LTE charging identifier for the session. One or more of the elements representing the Operator IP services 417, such as an application server or an S-CSCF requests the LTE charging identifier from PCRF 413. The element in the Operator IP services 417 is then operable to insert the LTE charging identifier in the AVPs of the Ro interface. The enhanced Gy interface and the enhanced Wo interface may also include similar AVPs designated for the LTE charging identifier.

Figure 5:
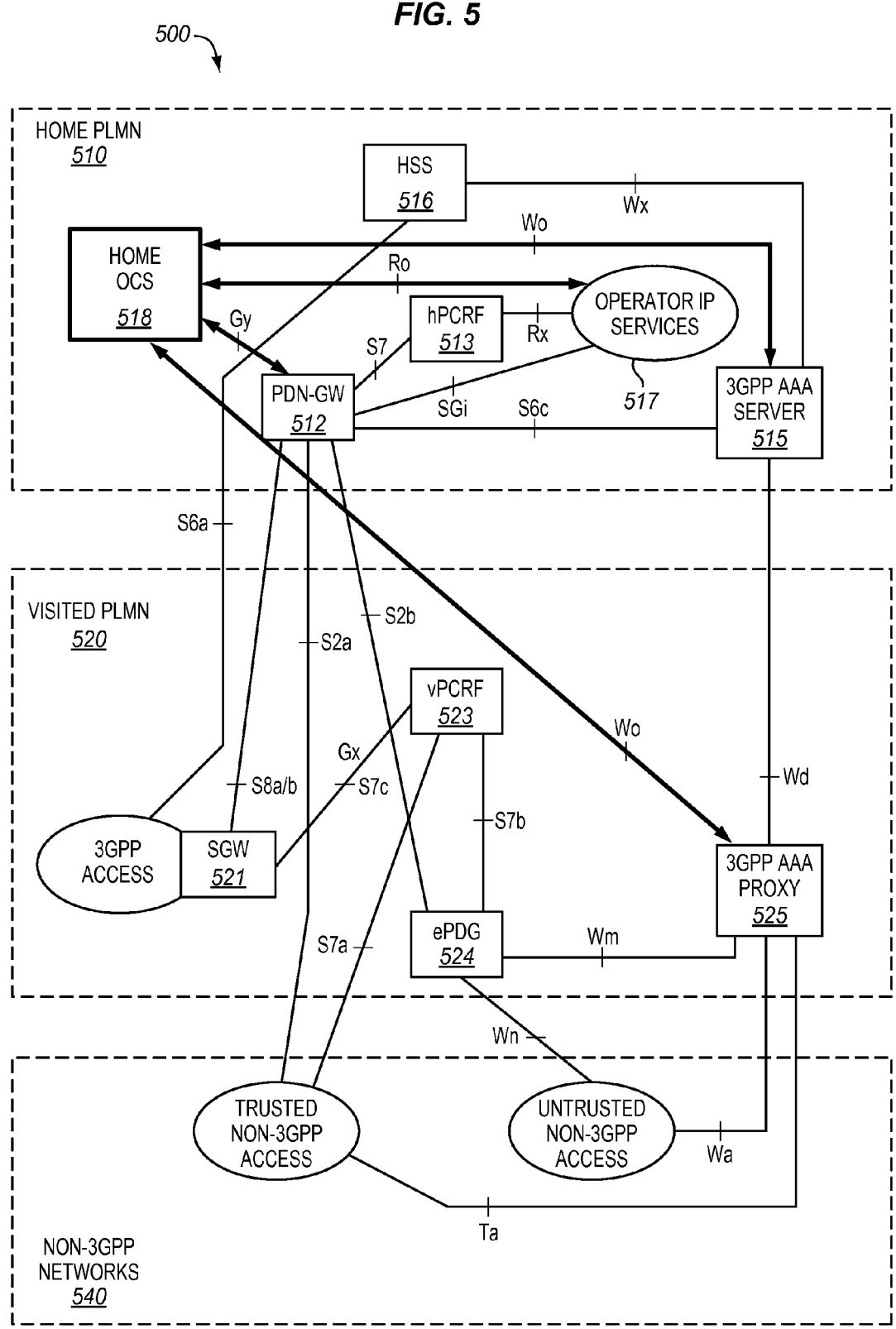
FIG. 5 illustrates an LTE/EPC communication network in a roaming scenario with home services in an exemplary embodiment of the invention.

FIG. 5 illustrates an LTE/EPC communication network 500 in a roaming scenario with home services in an exemplary embodiment of the invention. Communication network 500 includes a home PLMN 510 comprised of a plurality of network elements, a visited PLMN 520 comprised of a plurality of network elements, and non-3GPP networks 540. Home PLMN 510 includes a PDN-GW 512, a home PCRF (hPCRF) 513, a 3GPP AAA server 515, an HSS 516, home Operator IP services 517, and other network elements that are not illustrated for the sake of brevity. Visited PLMN 520 includes a SGW 521, a visited PCRF (vPCRF) 523, a PDG 524, a 3GPP AAA proxy 525, and other network elements that are not illustrated for the sake of brevity.

The charging architecture for communication network 500 includes a home OCS 518 that is implemented in PLMN 510. In this charging architecture, PDN-GW 512 communicates with OCS 518 through an enhanced Gy interface (or a modified Ro interface) to support online charging based on per data flow/per PDP session. 3GPP AAA server 515 and AAA proxy 525 communicate with home OCS 518 through an enhanced Wo interface to support online charging. Operator IP services 517 interface with OCS 518 through an enhanced Diameter Ro interface.

There are multiple options for implementing IP direct access charging via non-3GPP access. In one option, 3GPP AAA proxy 525 monitors IP direct access, and triggers a Diameter Wo credit request message to home OCS 518. In another option, 3GPP AAA proxy 525 has no connection/interface with home OCS 518. Instead, AAA proxy 525 transmits a credit request message to AAA server 515, and AAA server 515 triggers a Diameter Wo credit request message to home OCS 518.

Figure 6:
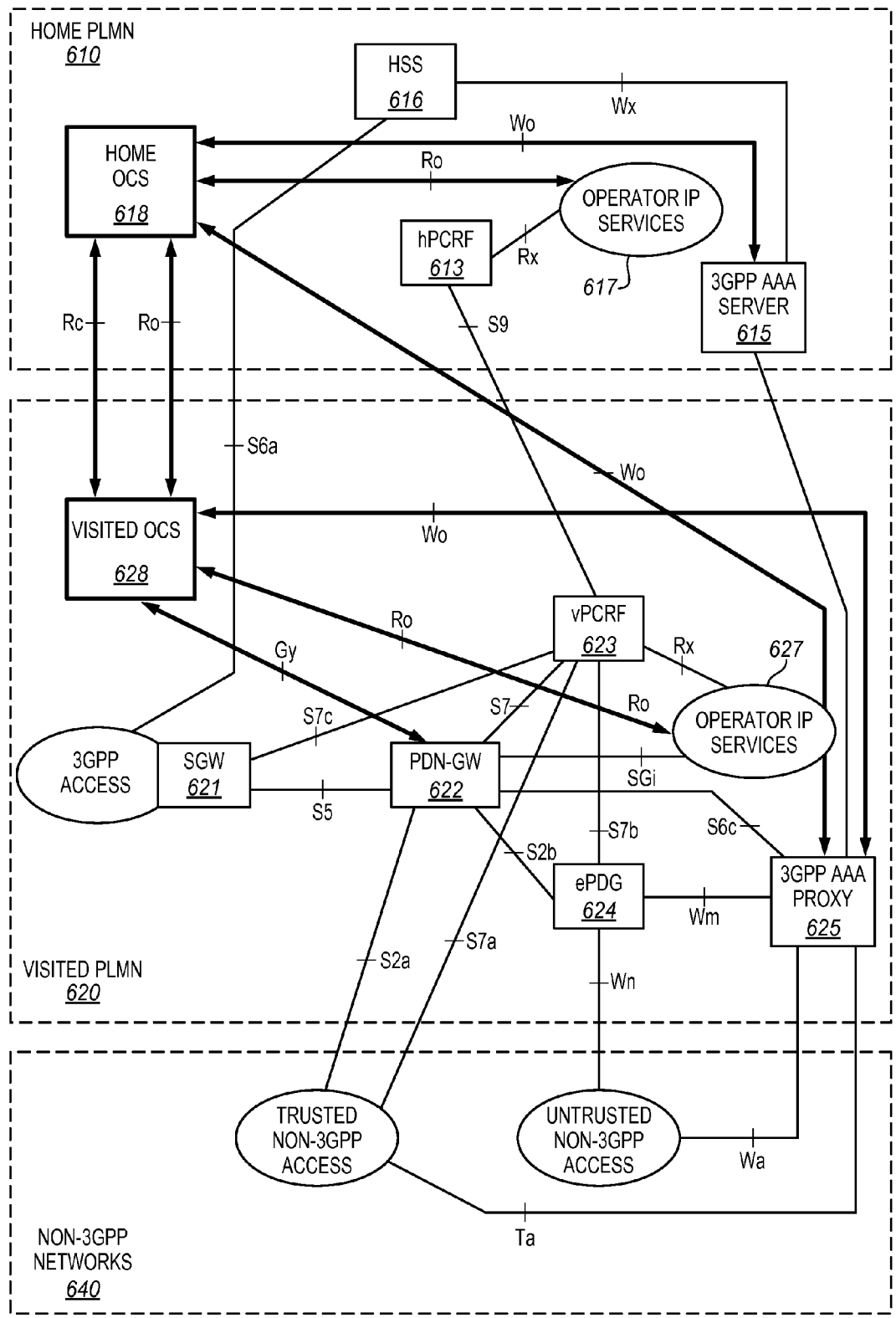
FIG. 6 illustrates an LTE/EPC communication network in a roaming scenario with visited services in an exemplary embodiment of the invention.

FIG. 6 illustrates an LTE/EPC communication network 600 in a roaming scenario with visited services (also referred to as local breakout) in an exemplary embodiment of the invention. Communication network 600 includes a home PLMN 610 comprised of a plurality of network elements, a visited PLMN 620 comprised of a plurality of network elements, and non-3GPP networks 640. Home PLMN 610 includes a home PCRF (hPCRF) 613, a 3GPP AAA server 615, an HSS 616, home Operator IP services 617, and other network elements that are not illustrated for the sake of brevity. Visited PLMN 620 includes a SGW 621, a PDN-GW 622, a visited PCRF (vPCRF) 623, a PDG 624, a 3GPP AAA proxy 625, visited Operator IP services 627, and other network elements that are not illustrated for the sake of brevity.

The charging architecture for communication network 600 includes a home OCS 618 that is implemented in home PLMN 610. In this charging architecture, 3GPP AAA server 615 and AAA proxy 625 communicate with home OCS 618 through an enhanced Wo interface to support online charging. Home Operator IP services 617 interfaces with OCS 618 through an enhanced Diameter Ro interface. The charging architecture further includes a visited OCS 628 that is implemented in visited PLMN 620. PDN-GW 622 communicates with visited OCS 628 through an enhanced Gy interface (or a modified Ro interface) to support online charging based on per data flow/per PDP session. In an alternative embodiment, PDN-GW 622 may communicate with home OCS 618 through the enhanced Gy interface. 3GPP AAA proxy 625 communicates with visited OCS 628 through an enhanced Wo interface to support online charging. Visited Operator IP services 627 interface with visited OCS 628 through an enhanced Diameter Ro interface.

There are again multiple options for implementing IP direct access charging via non-3GPP access. In one option, 3GPP AAA proxy 625 monitors IP direct access, and triggers a Diameter Wo credit request message to home OCS 618. In another option, 3GPP AAA proxy 625 has no connection/interface with home OCS 618. Instead, AAA proxy 625 transmits a credit request message to AAA server 615, and AAA server 615 triggers a Diameter Wo credit request message to home OCS 618. In another option, AAA proxy 625 transmits a credit request message to visited OCS 628, and visited OCS 628 forwards the credit request message to home OCS 618.

For charging for the Operator IP services (IMS) in the above embodiments, if the Operator IP service is used in the home network, then charging in the home network is triggered to the home OCS via Diameter Ro interface. Otherwise, if the Operator IP service is used in the visited network (local breakout service), then charging in the visited network is triggered to home OCS via Diameter Ro interface or is triggered to the visited OCS via Diameter Ro interface. The visited OCS will further trigger an Ro/Rc interface to the home OCS. The Operator IP services (IMS) will interface with the PCRF via Rx protocol to obtain the LTE charging ID for the session, and will include LTE charging ID in credit request messages to either the home OCS or the visited OCS.

Figure 7:
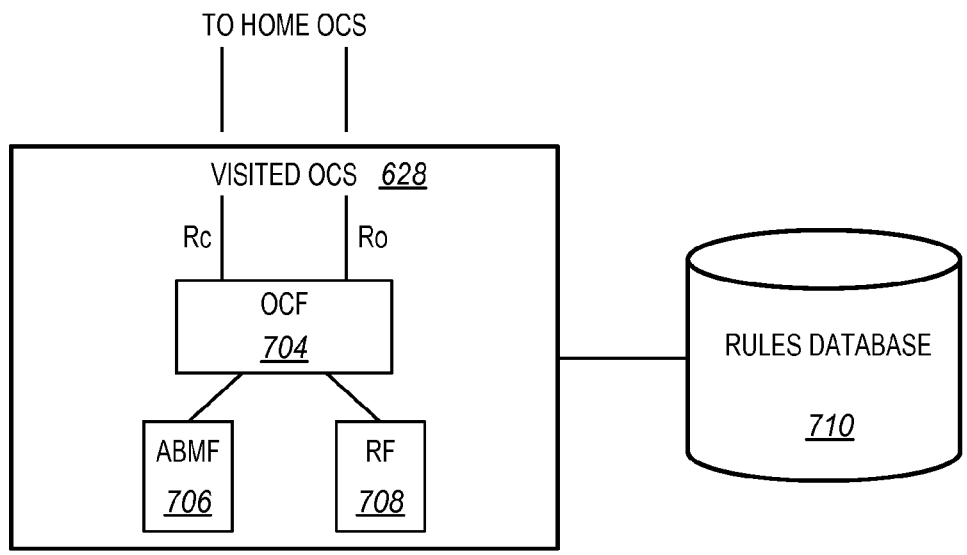
FIG. 7 is a block diagram illustrating a visited OCS in an exemplary embodiment of the invention.

FIG. 7 is a block diagram illustrating visited OCS 628 in an exemplary embodiment of the invention. In this embodiment, visited OCS 628 includes an online charging function (OCF) 704, an Account Balance Management Function (ABMF) 706, and a rating function (RF) 708. OCF 704 comprises any system, server, or function operable to manage online charging in visited OCS 628 by accessing ABMF 706 and RF 708. ABMF 706 comprises any system, server, or function operable to maintain an allotment of service units that was granted by home OCS 618. RF 708 comprises any system, server, or function operable to determine a charging rate for a session or service in visited PLMN 620 based on a tariff defined by the network operator.

Visited OCS 628 is coupled to a rules database 710. Rules database 710 comprises any server or data structure operable to store charging rules defining how online charging is performed between visited OCS 628 and home OCS 618 for roaming sessions. When a roaming session is initiated by a mobile device, such as in communication network 600 of FIG. 6, a network element (e.g., PDN-GW 622) is requested to provide a service for the session. The network element includes a Charging Trigger Function (CTF) that is operable to identify the service being requested. Because the user of the mobile device has subscribed to online charging (prepaid), the network element needs permission before providing the service. Thus, the CTF in the network element transmits a credit request message to visited OCS 628 with the appropriate request for authorization of the service and for a quota of service units for budget control. Visited OCS 628 then operates as follows.

Figure 8:
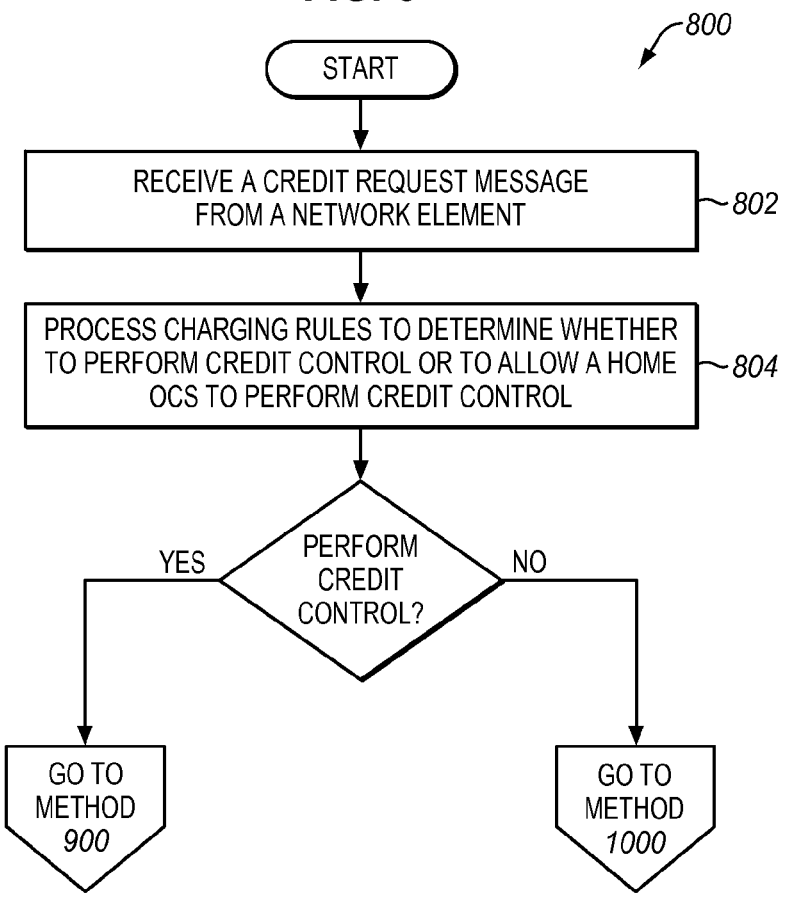
FIG. 8 is a flow chart illustrating a method of determining how online charging is performed in a visited OCS in an exemplary embodiment of the invention.

FIG. 8 is a flow chart illustrating a method 800 of determining how online charging is performed in visited OCS 628 in an exemplary embodiment of the invention. The steps of method 800 will be described with reference to communication network 600 in FIG. 6 and visited OCS 628 in FIG. 7, although method 800 may be performed by other communication networks. The steps of the flow chart in FIG. 8 are not all inclusive and may include other steps not shown.

In step 802, visited OCS 628 receives the credit request message from the network element. In response to the credit request message, visited OCS 628 processes the charging rules stored in rules database 710 to determine whether to perform credit control for the session (i.e., to act as a credit control function), or to allow home OCS 618 to perform credit control (i.e., to act as a pure proxy to home OCS 618) in step 804. The charging rules define which role visited OCS 628 should perform. For example, if the roaming session is over trusted non-3GPP access, then visited OCS 628 will already have the charging profile for the user of the mobile device. Thus, the charging rules may indicate that visited OCS 628 acts as a credit control function instead of home OCS 618. If the roaming session is over un-trusted non-3GPP access, then visited OCS 628 will not have the charging profile for the user. Visited OCS 628 would have to retrieve the charging profile from home OCS 618, which may cause security issues. Thus, the charging rules may indicate that home OCS 618 acts as the credit control function instead of visited OCS 628. The charging rules may apply to any information received over the Gy/Wo/Ro interfaces and other subscriber data, such as Service Context ID, Access address, Access type, Trigger service type, Interface type (e.g., Gy, Wo, or Ro), Application Type, Media Type, Bearer QoS, Subscriber category (e.g., Golden User or Silver User), etc.

Figure 9:
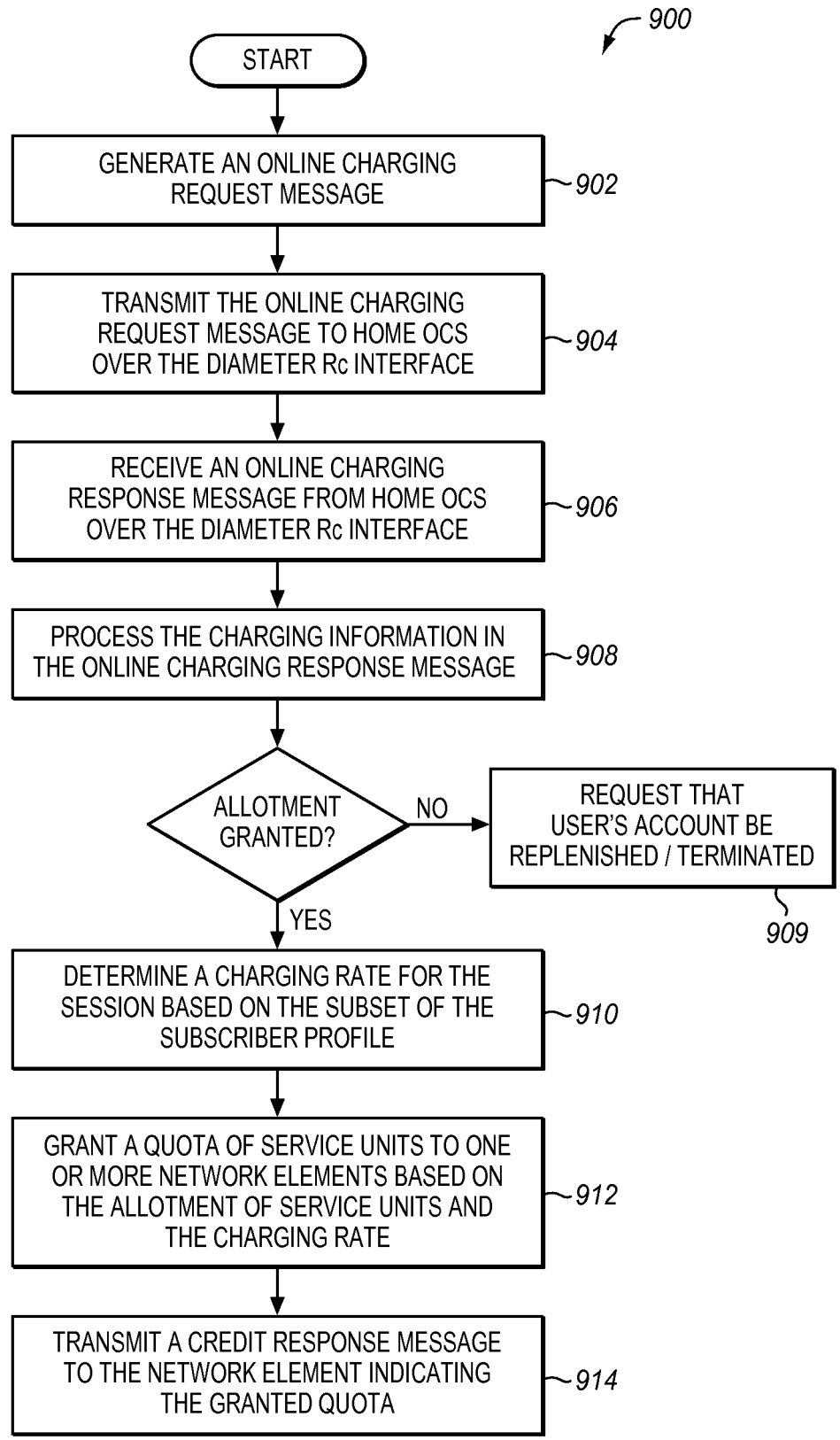
FIG. 9 is a flow chart illustrating a method of performing credit control in a visited OCS in an exemplary embodiment of the invention.

If the determination is for visited OCS 628 to act as the credit control function, then visited OCS 628 operates as described in method 900 of FIG. 9. If the determination is for visited OCS 628 to act as a pure proxy, then visited OCS 628 operates as described in method 1000 of FIG. 10.

FIG. 9 is a flow chart illustrating a method 900 of performing credit control in visited OCS 628 in an exemplary embodiment of the invention. In step 902, visited OCS 628 generates an online charging request message that requests the needed charging information in response to the credit request message. The charging information that is needed may vary depending on desired implementations. However, it is preferable to request a minimum of charging information as opposed to obtaining the entire subscriber profile of the user. Visited OCS 628 then transmits the online charging request message to home OCS 618 over the Diameter Rc interface in step 904.

In response to the online charging request message, home OCS 618 identifies a subscriber profile for the user of the mobile device. The subscriber profile (also referred to as a charging profile) indicates a service plan that the user has subscribed to, indicates a class of service for the user, and other relevant charging information. Home OCS 618 determines a subset of the subscriber profile of the user. The subset of the subscriber profile represents the information that home OCS 618 determines is needed or desired by visited OCS 628 in order to determine a rating or perform credit control per an agreement between network operators. Home OCS 618 also identifies an account balance for the roaming user. The account balance is typically maintained in an Account Balance Management Function (ABMF) in home OCS 618. The account balance represents the amount of money or other service units that the user has purchased in advance for the prepaid service. Home OCS 618 grants an allotment of service units from the account balance for the roaming user for the session in visited PLMN 620. The allotment comprises any portion of the account balance that home OCS 618 grants to visited OCS 628 for credit control. For example, if the user has a balance of 200 service units, then home OCS 618 may allocate 50 service units for the session in visited PLMN 620. The allotment will be divided up into different quotas for different network elements by visited OCS 628. Home OCS 618 inserts the subset of the subscriber profile and the allotment of service units as charging information in an online charging response message, and transmits the online charging response message to visited OCS 628.

In step 906, visited OCS 628 receives the online charging response message from home OCS 618 over the Diameter Rc interface. In step 908, OCF 704 (see FIG. 7) processes the charging information in the online charging response message to identify the allotment of service units granted by home OCS 618 (if any) and the subset of the subscriber profile. If an allotment was granted, then OCF 704 may store the allotment of service units in ABMF 706. If an allotment was not granted, then OCF 704 may request that the user's account be replenished or that the session be terminated in step 909.

In step 910, rating function 708 determines a rating for the session based on the subset of the subscriber profile provided by home OCS 618. For instance, the subset of the subscriber profile may indicate a tariff that is applied to roaming sessions for the user. In step 912, OCF 704 grants a quota of service units to the requesting network element and other network elements in visited PLMN 620 based on the allotment of service units, the rating, and the service and data types. For example, assume that the network element transmits a credit request message to visited OCS 628 for a service that the network element is to provide for the session. Responsive to the credit request message (e.g., a Diameter Credit Control Request (CCR) message), OCF 704 grants a quota of service units from the allotment that was granted by home OCS 618. OCF 704 then transmits a credit response message (e.g., a Diameter Credit Control Answer (CCA) message) to the network element indicating the quota granted to the network element in step 914. The CTF in the network element may then provide budget control based on the granted quota. OCF 704 provides credit control for each of the network elements in visited PLMN 620 that are serving the session by granting quotas based on the allotment of service units.

As OCF 704 provides credit control for the network element, ABMF 706 monitors the allotment of service units. If the allotment of service units expires, then visited OCS 628 generates another online charging request message that requests a new allotment of service units, and transmits the online charging request message to home OCS 618. If there is a sufficient account balance for the user, then home OCS 618 may grant another allotment of service units in response to the online charging request message and the process continues.

Figure 10:
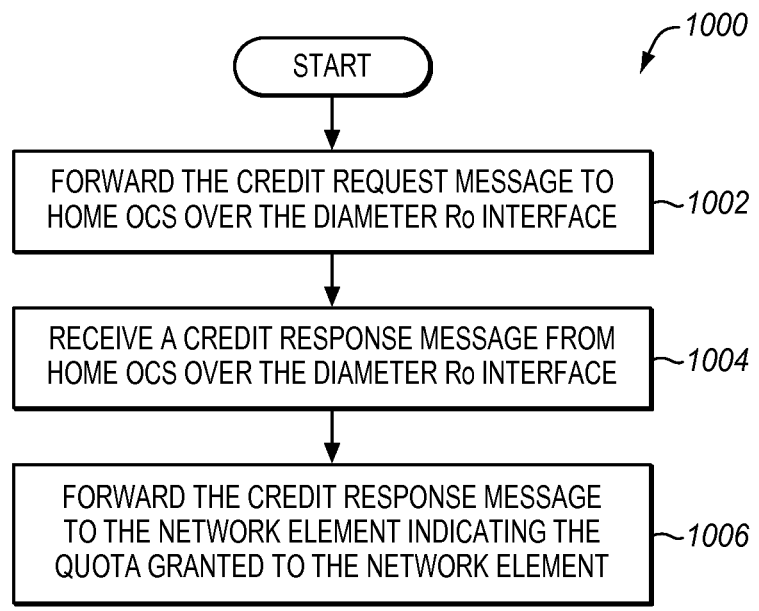
FIG. 10 is a flow chart illustrating a method of performing proxy functions in a visited OCS in an exemplary embodiment of the invention.

FIG. 10 is a flow chart illustrating a method 1000 of performing proxy functions in visited OCS 628 in an exemplary embodiment of the invention. For this method, visited OCS 628 acts as a pure proxy to home OCS 618 which will provide credit control. Visited OCS 628 does not perform rating and charging functions as described in FIG. 9. To act as a proxy, visited OCS 628 forwards the credit request message to home OCS 618 over the Diameter Ro interface in step 1002. For example, if the credit request message received from the network element comprises a Diameter CCR message, then visited OCS 628 forwards the Diameter CCR message over the Diameter Ro interface to home OCS 618.

In response to the credit request message, home OCS 618 acts as a traditional credit control function. Home OCS 618 identifies an account balance for the roaming user, and grants a quota of service units from the account balance for the network element that is providing the service. Home OCS 618 then generates a credit response message, such as a Diameter CCA message. Home OCS 618 inserts the granted quota in the credit response message, and transmits the credit response message to visited OCS 628.

In step 1004, visited OCS 628 receives the credit response message from home OCS 618. In step 1006, visited OCS 628 forwards the credit response message to the network element indicating the quota granted to the network element. The CTF in the network element may then provide budget control based on the granted quota. If the quota expires, then the network element will need to request another quota of service units from home OCS 618, which is providing credit control for the session.

Although specific embodiments were described herein, the scope of the invention is not limited to those specific embodiments. The scope of the invention is defined by the following claims and any equivalents thereof.

We claim:

1. A system comprising:
at least one Long Term Evolution (LTE) network element of an LTE communication network that connects to an Online Charging System (OCS) over an enhanced interface;
the at least one LTE network element is operable to generate a credit request message responsive to a charging event for a session involving a mobile device, and to identify access information for the session indicating a type of access for the mobile device to the LTE communication network, wherein the access information indicates that the mobile device accesses the LTE communication network using one of 3GPP access, trusted non-3GPP access, and un-trusted non-3GPP access;
the at least one LTE network element is operable to insert the access information in the credit request message, and to transmit the credit request message over the enhanced interface to the OCS to allow the OCS to determine a charging rate for the session based on the access information.

2. The system of claim 1 wherein:
the OCS is operable to receive the credit request message, to process the credit request message to identify the access information included in the credit request message, and to determine a charging rate for the session based on the access information.

3. The system of claim 1 wherein:
the at least one LTE network element comprises a Packet Data Network Gateway (PDN-GW);
the enhanced interface comprises an enhanced Gy interface; and
the enhanced Gy interface includes at least one Attribute Value Pair (AVP) that indicates the access information.

4. The system of claim 1 wherein:
the at least one LTE network element comprises a 3GPP AAA server or 3GPP AAA proxy;
the enhanced interface comprises an enhanced Diameter Wo interface; and
the enhanced Diameter Wo interface includes an Attribute Value Pair (AVP) that indicates the access information.

5. The system of claim 1 wherein:
the at least one LTE network element is further operable to identify an LTE charging identifier for the session, and to insert the LTE charging identifier in the credit request message.

6. The system of claim 5 further comprising a Policy and Charging Rules Function (PCRF), wherein:
the at least one LTE network element is further operable to transmit a request for charging rules to the PCRF;
the PCRF is operable to receive the request that includes at least one network/access charging identifier, to identify a charging profile defined for the mobile device, to identify the charging rules for the session, to assign the LTE charging identifier for the session by associating the network/access charging identifiers for the session, and to transmit the charging rules and the LTE charging identifier to the at least one LTE network element.

7. The system of claim 1 wherein:
the OCS comprises a visited OCS in a visited network; and
the visited OCS is operable to receive the credit request message, and to process charging rules defined for the mobile device to determine whether to provide credit control or to allow a home OCS in a home network to perform credit control.

8. The system of claim 7 wherein if the determination is to provide credit control, then:
the visited OCS is further operable to generate an online charging request message that requests charging information, to transmit the online charging request message to the home OCS over an enhanced Diameter Rc interface, to receive an online charging response message from the home OCS over the enhanced Diameter Rc interface that includes charging information for the session wherein the charging information includes at least an allotment of service units granted by the home OCS for the session, to process the charging information in the online charging response message to determine a charging rate for the session, to grant a quota of service units for the at least one LTE network element based on the allotment of service units and the charging rate, and to transmit a credit response message to the at least one LTE network element indicating the granted quota.

9. The system of claim 7 wherein if the determination is to allow the home OCS to perform credit control, then:
the visited OCS is further operable to forward the credit request message to the home OCS over an enhanced Diameter Ro interface, to receive a credit response message from the home OCS that includes a quota granted for the at least one LTE network element, and to forward the credit response message to the at least one LTE network element indicating the granted quota.

10. A method of performing online charging in a Long Term Evolution (LTE) communication network comprised of at least one LTE network element that is serving a session involving a mobile device, the method comprising:
generating a credit request message in the at least one LTE network element responsive to a charging event for the session;
identifying access information for the session that indicates a type of access for the mobile device to the LTE communication network, wherein the access information indicates that the mobile device accesses the LTE communication network using one of 3GPP access, trusted non-3GPP access, and un-trusted non-3GPP access;
inserting the access information in the credit request message; and
transmitting the credit request message to an Online Charging System (OCS) over an enhanced interface to allow the OCS to determine a charging rate for the session based on the access information.

11. The method of claim 10 further comprising:
receiving the credit request message in the OCS;
processing the credit request message to identify the access information included in the credit request message; and
determining a charging rate for the session based on the access information.

12. The method of claim 10 wherein:
the at least one LTE network element comprises a Packet Data Network Gateway (PDN-GW);
the enhanced interface comprises an enhanced Gy interface; and
the enhanced Gy interface includes at least one Attribute Value Pair (AVP) that indicates the access information.

13. The method of claim 10 wherein:
the at least one LTE network element comprises a 3GPP AAA server or 3GPP AAA proxy;
the enhanced interface comprises an enhanced Diameter Wo interface; and
the enhanced Diameter Wo interface includes an Attribute Value Pair (AVP) that indicates the access information.

14. The method of claim 10 further comprising:
identifying an LTE charging identifier for the session; and
inserting the LTE charging identifier in the credit request message.

15. The method of claim 10 wherein the OCS comprises a visited OCS in a visited network, the method further comprising:
receiving the credit request message in the visited OCS; and
processing charging rules defined for the mobile device to determine whether to provide credit control in the visited OCS or to allow a home OCS in a home network to perform credit control.

16. The method of claim 15 wherein if the determination is to provide credit control in the visited OCS, then the method further comprises:
generating an online charging request message that requests charging information;
transmitting the online charging request message to the home OCS over an enhanced Diameter Rc interface;
receiving an online charging response message from the home OCS over the enhanced Diameter Rc interface that includes charging information for the session wherein the charging information includes at least an allotment of service units granted by the home OCS for the session;
processing the charging information in the online charging response message to determine a charging rate for the session;
granting a quota of service units for the at least one LTE network element based on the allotment of service units and the charging rate; and
transmitting a credit response message to the at least one LTE network element indicating the granted quota.

17. The method of claim 15 wherein if the determination is to allow the home OCS to perform credit control, then the method further comprises:
forwarding the credit request message to the home OCS over an enhanced Diameter Ro interface;
receiving a credit response message from the home OCS that includes a quota granted for the at least one LTE network element; and
forwarding the credit response message to the at least one LTE network element indicating the granted quota.

18. A system, comprising:
a visited Online Charging System (OCS) in a visited Public Land Mobile Network (PLMN) of a Long Term Evolution (LTE) communication network; and
a charging rules database coupled to the visited OCS and operable to store charging rules defining how online charging is performed for a mobile device between the visited OCS and a home OCS of a home PLMN of the LTE communication network for roaming sessions;
the visited OCS is operable to receive a credit request message from a network element in the visited PLMN for a roaming session involving the mobile device, and to process the charging rules from the charging rules database responsive to the credit request message to determine whether to provide credit control in the visited OCS or to allow the home OCS to perform credit control for the roaming session.

19. The system of claim 18 wherein if the determination is to provide credit control in the visited OCS, then:
the visited OCS is further operable to generate an online charging request message that requests charging information, to transmit the online charging request message to the home OCS over an enhanced Diameter Rc interface, to receive an online charging response message from the home OCS over the enhanced Diameter Rc interface that include charging information for the session wherein the charging information includes at least an allotment of service units granted by the home OCS for the session, to process the charging information in the online charging response message to determine a charging rate for the session, to grant a quota of service units for the network element based on the allotment of service units and the charging rate, and to transmit a credit response message to the network element indicating the granted quota.

20. The system of claim 18 wherein if the determination is to allow the home OCS to perform credit control, then:
the visited OCS is further operable to forward the credit request message to the home OCS over an enhanced Diameter Ro interface, to receive a credit response message from the home OCS that includes a quota granted for the network element, and to forward the credit response message to the network element indicating the granted quota.

* * * * *